(12) United States Patent
Doll et al.

(10) Patent No.: US 10,305,479 B1
(45) Date of Patent: May 28, 2019

(54) FAULT ATTACK PROTECTION AGAINST SYNCHRONIZED FAULT INJECTIONS

(71) Applicant: NXP B.V., Eindhoven (NL)

(72) Inventors: Stefan Doll, Munich (DE); Markus Regner, Munich (DE); Sandeep Jain, Noida (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/006,457

(22) Filed: Jun. 12, 2018

(51) Int. Cl.
| | |
|---|---|
| *H03K 19/003* | (2006.01) |
| *H03K 5/24* | (2006.01) |
| *H03K 5/13* | (2014.01) |
| *H03K 5/00* | (2006.01) |

(52) U.S. Cl.
CPC .......... *H03K 19/003* (2013.01); *H03K 5/13* (2013.01); *H03K 5/24* (2013.01); *H03K 2005/00019* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,032,708 | A * | 7/1991 | Comerford | G06F 21/34 235/441 |
| 5,604,806 | A * | 2/1997 | Hassan | H04J 13/00 380/270 |
| 8,896,455 | B2 * | 11/2014 | Eguro | G06F 21/86 324/649 |
| 9,423,819 | B2 * | 8/2016 | Marandi | G06E 1/00 |
| 9,961,093 | B1 * | 5/2018 | Wittenstein | H04L 63/1416 |
| 10,015,756 | B1 * | 7/2018 | Bullington | H04W 52/52 |
| 10,057,373 | B1 * | 8/2018 | Chang | G06F 16/283 |
| 2004/0190725 | A1 * | 9/2004 | Yuan | H04B 10/25 380/283 |
| 2004/0233935 | A1 * | 11/2004 | Yuan | B82Y 10/00 370/474 |
| 2005/0100351 | A1 * | 5/2005 | Yuan | H04B 10/70 398/214 |

(Continued)

FOREIGN PATENT DOCUMENTS

CN 104101486 B 7/2016

OTHER PUBLICATIONS

B. Selmke, et al. "Attack on DFA protected AES by Simultaneous Laser Fault Injections", Fraunhofer AISEC, Aug. 16, 2016. 29 pages.

*Primary Examiner* — Adam D Houston
(74) *Attorney, Agent, or Firm* — Rajeev Madnawat

(57) ABSTRACT

Various embodiments relate to a circuit, including: a first secure circuit configured to receive an input and to produce a first output; a first delay circuit configured to receive the first output and to produce a first delayed output delayed by a time N; a second delay circuit configured to receive the input and to produce a delayed input delayed by a time N; a second secure circuit configured to receive the delayed input and to produce a second delayed output; and a comparator configured to compare the first delayed output to the second delayed output and to produce a result, wherein the result is one of the first delayed output or second delayed output when the first delayed output matches the second delayed output and the result is an error value when the first delayed output does not match the second delayed output.

19 Claims, 2 Drawing Sheets

(56) References Cited

U.S. PATENT DOCUMENTS

| | | | | |
|---|---|---|---|---|
| 2005/0180575 | A1* | 8/2005 | Maeda | H04L 7/0075 380/278 |
| 2006/0025897 | A1* | 2/2006 | Shostak | B60C 23/005 701/1 |
| 2008/0219268 | A1* | 9/2008 | Dennison | H04L 12/4625 370/395.2 |
| 2010/0127822 | A1* | 5/2010 | Devadas | H04L 9/3278 340/5.8 |
| 2010/0325415 | A1* | 12/2010 | Ohlman | H04L 12/1881 713/150 |
| 2011/0029828 | A1* | 2/2011 | Bancel | G06F 1/10 714/724 |
| 2011/0214187 | A1* | 9/2011 | Wittenstein | H04L 63/1425 726/25 |
| 2011/0286465 | A1* | 11/2011 | Koodli | H04W 68/00 370/401 |
| 2011/0302653 | A1* | 12/2011 | Frantz | G06F 21/552 726/22 |
| 2013/0031576 | A1* | 1/2013 | Koemmerling | H04N 7/1675 725/31 |
| 2013/0145010 | A1* | 6/2013 | Luna | H04W 40/248 709/223 |
| 2014/0295794 | A1* | 10/2014 | Doumen | G06F 21/123 455/411 |
| 2014/0304798 | A1* | 10/2014 | Iyengar | H04L 63/1458 726/11 |
| 2015/0105687 | A1* | 4/2015 | Abreu | A61B 5/01 600/549 |
| 2015/0121506 | A1* | 4/2015 | Cavanaugh | G06F 21/62 726/16 |
| 2015/0150116 | A1* | 5/2015 | Baldwin | G06F 21/32 726/16 |
| 2015/0215325 | A1* | 7/2015 | Ogawa | G06F 16/13 726/23 |
| 2015/0364433 | A1* | 12/2015 | Hindman | H01L 27/092 326/16 |
| 2015/0369865 | A1* | 12/2015 | Hershman | G01R 31/31719 326/8 |
| 2016/0098333 | A1* | 4/2016 | Hershman | G06F 21/75 714/41 |
| 2016/0217399 | A1* | 7/2016 | Roelofs | G06Q 10/0635 |
| 2016/0345054 | A1* | 11/2016 | Dhaipule | H04N 21/4384 |
| 2017/0019388 | A1* | 1/2017 | Kamble | H04L 63/061 |
| 2017/0060102 | A1* | 3/2017 | Sargolzaei | G05B 13/021 |
| 2017/0155502 | A1 | 6/2017 | Yanamandra | |
| 2017/0244546 | A1* | 8/2017 | Stark | G06F 7/582 |
| 2017/0310688 | A1* | 10/2017 | Lecomte | G09C 1/00 |
| 2017/0364683 | A1* | 12/2017 | Willden | G06F 9/4403 |
| 2017/0364709 | A1* | 12/2017 | Plusquellic | G06F 21/70 |
| 2018/0046805 | A1* | 2/2018 | Le Roy | G06F 1/30 |
| 2018/0183591 | A1* | 6/2018 | De Laat | H04L 9/12 |
| 2018/0268019 | A1* | 9/2018 | Rostagni | G06F 16/2365 |
| 2018/0286258 | A1* | 10/2018 | Derbanne | G08G 1/164 |
| 2019/0013878 | A1* | 1/2019 | Paraiso | H04B 10/70 |
| 2019/0026724 | A1* | 1/2019 | Wade | G06Q 20/341 |
| 2019/0028283 | A1* | 1/2019 | Sharifi | H04L 9/0866 |
| 2019/0028284 | A1* | 1/2019 | Rezayee | H04L 9/3278 |
| 2019/0042249 | A1* | 2/2019 | Suresh | G06F 9/30036 |
| 2019/0052456 | A1* | 2/2019 | Bygrave | H04L 9/3263 |

* cited by examiner

US 10,305,479 B1

FAULT ATTACK PROTECTION AGAINST SYNCHRONIZED FAULT INJECTIONS

TECHNICAL FIELD

Various exemplary embodiments disclosed herein relate generally to fault attack protection against synchronized fault injections.

BACKGROUND

Various schemes have been developed for attacking cryptographic hardware including fault attacks where faults are injected into the cryptographic hardware. An attacker can then induce faults and analyze the results to obtain secret information regarding the cryptographic hardware such as a cryptographic key.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a circuit, including: a first secure circuit configured to receive an input and to produce a first output; a first delay circuit configured to receive the first output and to produce a first delayed output delayed by a time N; a second delay circuit configured to receive the input and to produce a delayed input delayed by a time N; a second secure circuit configured to receive the delayed input and to produce a second delayed output; and a comparator configured to compare the first delayed output to the second delayed output and to produce a result, wherein the result is one of the first delayed output or second delayed output when the first delayed output matches the second delayed output and the result is an error value when the first delayed output does not match the second delayed output.

Various embodiments are described, wherein the value of N is randomly selected.

Various embodiments are described, wherein the value of N is periodically changed.

Various embodiments are described, further including: a third delay circuit configured to receive the result and to produce a delayed result delayed by a time M.

Various embodiments are described, wherein the value of N is randomly selected and the value of M=x−N where x is a constant total delay value.

Various embodiments are described, wherein the value of N and M are periodically changed.

A method of securely producing an output by a circuit, including: receiving an input by a first secure circuit and producing a first output; receiving the output by a first delay circuit and producing a first delayed output delayed by a time N; receiving the input by a second delay circuit and producing a delayed input delayed by a time N; receiving the delayed input by a second secure circuit and producing a second delayed output; and comparing by a comparator the first delayed output to the second delayed output and producing a result, wherein the result is one of the first delayed output or second delayed output when the first delayed output matches the second delayed output and the result is an error value when the first delayed output does not match the second delayed output.

Various embodiments are described, wherein the value of N is randomly selected.

Various embodiments are described, wherein the value of N is periodically changed.

Various embodiments are described wherein further including: receiving the result by a third delay circuit and producing a delayed result delayed by a time M.

The method of claim 10, wherein the value of N is randomly selected and the value of M=x−N where x is a constant total delay value.

Various embodiments are described, wherein the value of N and M are periodically changed.

Further various embodiments relate to a circuit, including: a first delay circuit configured to receive an input and to produce a first delayed input delayed by a time a·N, where N is a time delay and a is a scalar value from 0 to n; a second delay circuit configured to receive the input and to produce a second delayed input delayed by a time b·N, where b is a scalar value from 0 to n; a third delay circuit configured to receive the input and to produce a third delayed input delayed by a time c·N, where c is a scalar value from 0 to n; a first secure circuit configured to receive the first delayed input and to produce a first delayed output; a second secure circuit configured to receive the second delayed input and to produce a second delayed output; a third secure circuit configured to receive the third delayed input and to produce a third delayed output; a fourth delay circuit configured to receive the first delayed output and to produce a fourth delayed output delayed by a time (n−a)·N; a fifth delay circuit configured to receive the second delayed output and to produce a fifth delayed output delayed by a time (n−b)·N; a sixth delay circuit configured to receive the third delayed output and to produce a sixth delayed output delayed by a time (n−c)·N; and a comparator configured to compare the fourth delayed output, the fifth delayed output, and sixth delayed output and to produce a result, wherein the result is one of the fourth delayed output, fifth delayed output, or second delayed output when the fourth delayed output, the fifth delayed output, and sixth delayed output are all equal to one another and the result is an error value otherwise.

Various embodiments are described, wherein the value of N is randomly selected.

Various embodiments are described, wherein the value of N is periodically changed.

Various embodiments are described, further including: a third delay circuit configured to receive the result and to produce a delayed result delayed by a time M.

Various embodiments are described, wherein the value of N is randomly selected and the value of M=x−N where x is a constant total delay value.

Various embodiments are described, wherein the value of N and M are periodically changed.

Various embodiments are described, wherein at least two of the scalar values a, b, and c are different.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Attackers of secure circuits (such as cryptographic accelerators) may attempt to corrupt the outputs of these circuits with fine granularity (ideally bit by bit) in order to observe the reaction of the overall device or to create a favorable reaction. Fault attacks such as laser attacks may be employed for this purpose. In such an attack, a laser beam is focused on a specific part of a circuit to cause a fault in a specific bit or set of bits. By observing inputs and outputs to the secure circuit during normal operation and then the operation of the circuit when faults are induced, an attacker may perform statistical and/or other analysis to gain information regarding secure information such as a cryptographic key.

Figure 1:
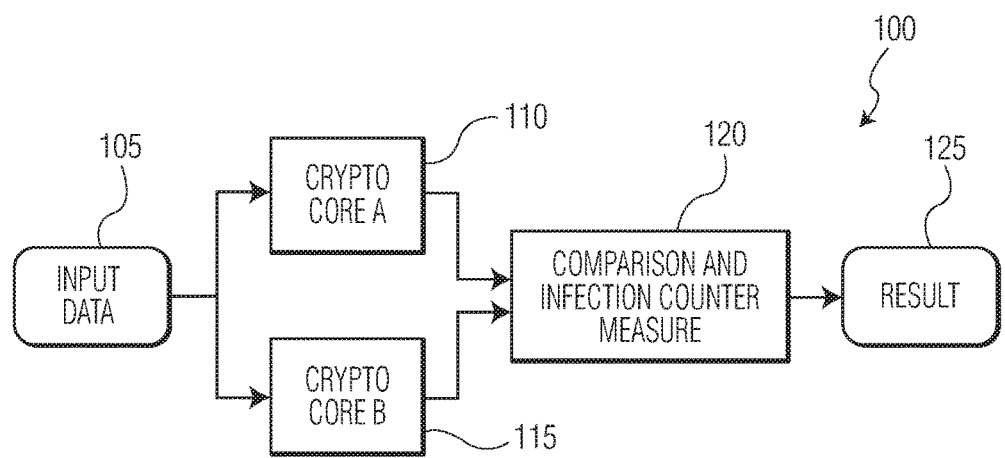
FIG. 1 illustrates a secure circuit using redundant secure circuits.

As a counter measure against such fault attacks, secure circuits may be implemented redundantly, for example with two or more instantiations of the secure circuit, and the outputs of the redundant secure circuits combined with comparison logic. That is the output of the two different circuits are compared, and if they match then the outputs are valid, and if the outputs do not match then the outputs are invalid. FIG. 1 illustrates a secure circuit 100 using redundant secure circuits. Specifically, crypto cores 110 and 115 both receive the same input data 105. The operation of the two crypto cores 110 and 115 are time synchronized. The output of the two crypto cores 110 and 115 are then input into a comparison and infection counter measure circuit 120. If the outputs of the two crypto cores match, then the outputs of the crypto cores 110 and 115 are considered valid and output as the result 125. If the outputs of two crypto cores do not match, then an error value is produced by the comparison and infection counter measure circuit 120 as the result where errors are inserted in the result to affect a larger number of bits than the number of bits corrupted by the attacker. As a result, an attacker trying to modify only a few bits of the result 125 would instead end up disturbing a large number of bits. This limits what an attacker can learn with such attacks. The comparison and infection counter measure circuit may also be called a comparator.

Previously it was thought to be difficult to coordinate attacks on multiple instances of a security circuit at precisely the correct time. This redundant implementation of security circuits requires an attacker to attack all instances simultaneously and with precise timing which is much harder to accomplish. However, researchers have devised new methods to coordinate the attack on all redundant instances of the security circuit at the same time, e.g. using optical methods such as splitting a laser beam with a prism. These methods overcome the previously high barrier to synchronize the attacks.

Embodiments that protect the circuit against these simple synchronization attacks will now be described. Such attacks may be countered by inserting delays in the circuits at different locations in the redundant instances.

Figure 2:
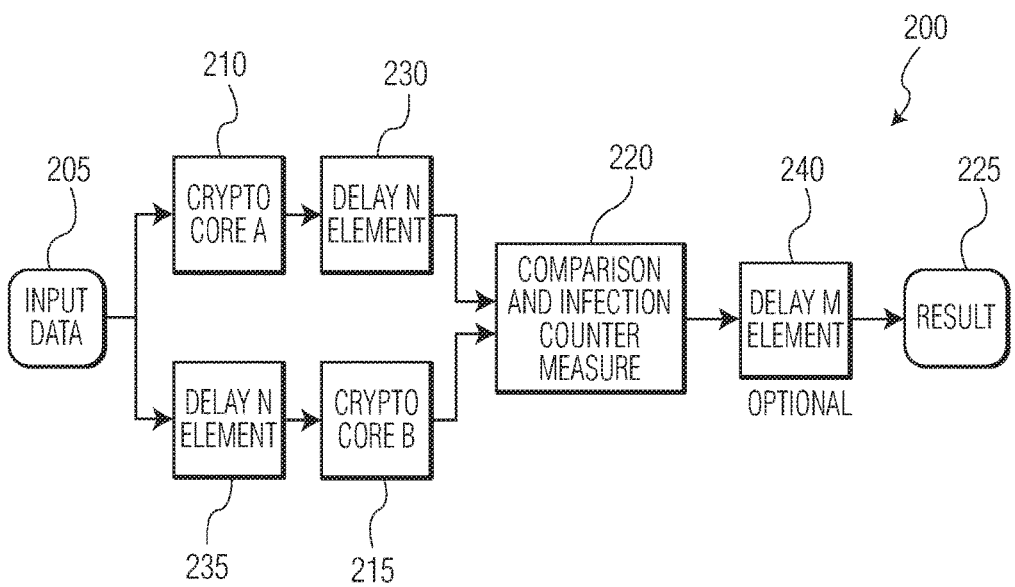
FIG. 2 illustrates an embodiment of a secure circuit using redundant secure circuits with additional delays.

FIG. 2 illustrates an embodiment of a secure circuit using redundant secure circuits with additional delays. Specifically, the secure circuit includes crypto cores 210 and 215, comparison and infection counter measure circuit 220, and delay circuits 230, 235, and 240. Crypto core 210 receives the input data 205. The crypto core 210 then processes the input data and produces an output that is fed into a delay circuit 230. The delay circuit 230 delays the output of the crypto core 210 by a time N. The output of the delay circuit is then input to the comparison and infection counter measure circuit 220. The input data 205 is also input to a delay circuit 235 that delays the input 205 by a time N. The crypto core 215 then receives the delayed input from the delay circuit 235. The output of the crypto core 215 is then input into a comparison and infection counter measure circuit 220. If the outputs of the crypto core 215 and the delay circuit 230 match, then crypto core outputs are considered valid. If the outputs of crypto core 215 and the delay circuit 230 do not match, then an error value is produced by the comparison and infection counter measure circuit 220 as the result 225 where errors are inserted in the result 225 to affect a larger number of bits than the number of bits corrupted by the attacker. The output of the comparison and infection counter measure circuit 220 may optionally be input to a delay element 240 that delays the assertion of the result 225 by a time M.

In FIG. 2, it can be seen that the inputs for redundant crypto core 215 will be available only at a certain delay N after the input has become available for crypto core 210. As a result, crypto core 210 will produce its output earlier then crypto core 215. However, as the output of crypto core 210 is delayed by the same amount of time N, the comparison of the output of the crypto cores 210 and 215 for the same input will happen at the same time. Now a synchronized attack by an attacker, would corrupt outputs of the crypto cores at different times, which would be detected by the comparison and infection counter measure circuit, which would then introduce additional errors into the output to thwart the attack.

As noted, the delay circuit 240 may be optionally added where the delay circuit 240 delays the output by a time M. The difficulty for the attacker may be further increased by varying the delay N over time, e.g., based on the output of a random number generator. The value of N may be changed at some regular or even varying period. Further, the randomness of the delay N may be hidden by keeping the sum of M+N constant. In this situation, M is selected as M=x−N, where x is a fix total delay and N randomly chosen.

Figure 3:
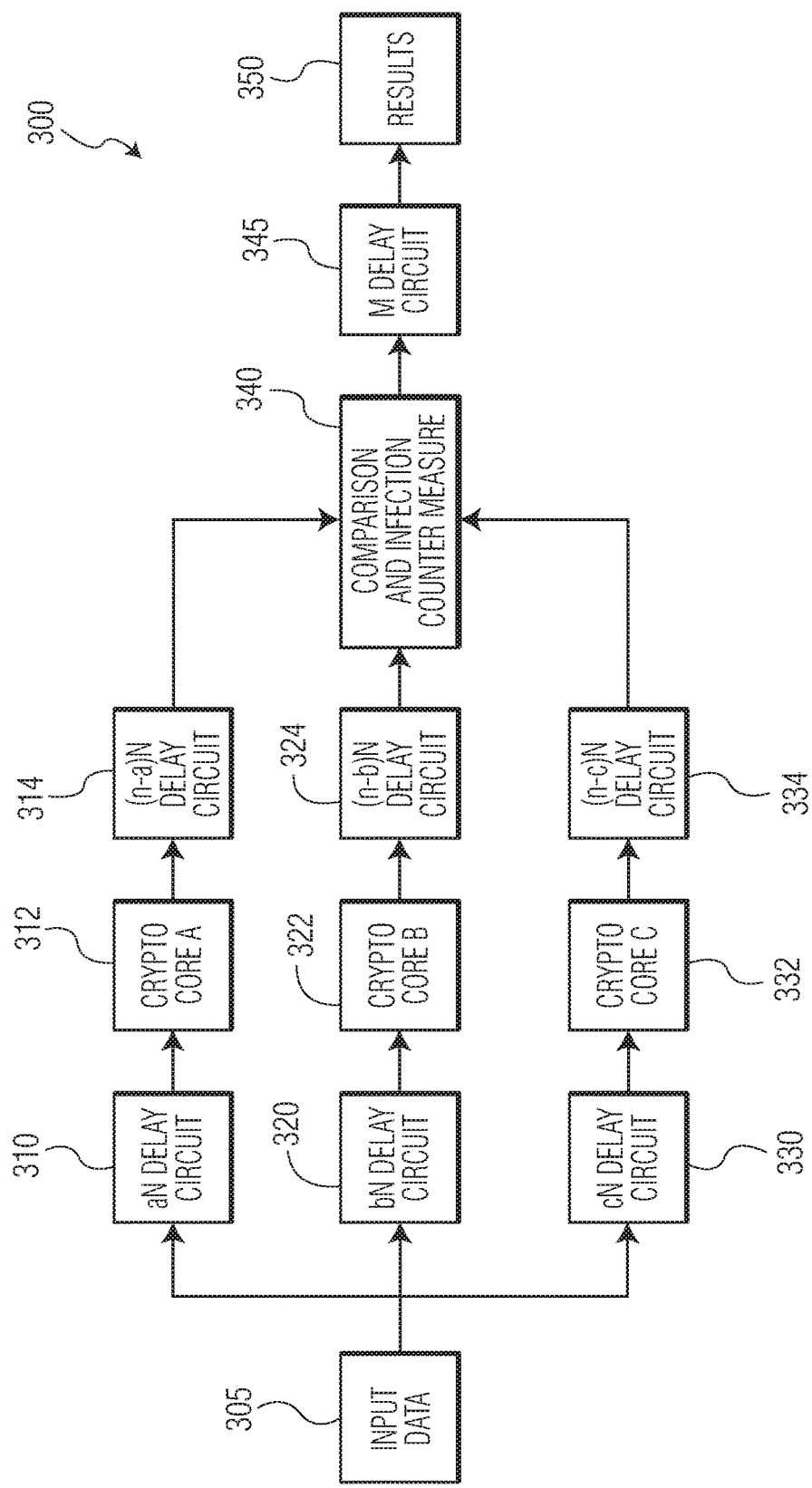
FIG. 3 illustrates another embodiment of a secure circuit using redundant secure circuits with additional delays.

FIG. 3 illustrates another embodiment of a secure circuit using redundant secure circuits with additional delays. The secure circuit 300 illustrates how the use of the delays may be generalized to more than two instances of secure circuit. Specifically, the secure circuit includes crypto cores 312, 322, and 332, comparison and infection counter measure circuit 340, and delay circuits 310, 314, 320, 324, 330, 334, and 345. The delay circuits 310, 320, and 330 receive the input data 305. The delay circuits 310, 320, and 330 each output the input data delayed by aN, bN, and cN respectively. N is a time delay. The values a, b, and c are scalar values from 0 to n that are chosen to be different for each delay circuit so that the total delay is different for each circuit. The outputs of the delay circuits 310, 320, and 330 are input to the crypto cores 312, 322, and 332 respectively. The outputs of the crypto cores 312, 322, and 332 are then input to delay circuits 314, 324, and 334 respectively. Delay circuits 314, 324, and 334 have delays of (n-a)N, (n-b)N, and (n-c)N respectively. The outputs of delay circuits 314, 324, and 334 are then input to the comparison and infection counter measure circuit 340. If the outputs of all the delay circuits 314, 324, and 334 match, then crypto core outputs are considered valid. If the outputs of delay circuits 314, 324, and 334 do not match, then an error value is produced by the comparison and infection counter measure circuit 340 as the result 350 where errors are inserted in the result 350 to affect a larger number of bits than the number of bits corrupted by the attacker. The output of the comparison and infection counter measure circuit 340 may optionally be input to a delay element 345 that delays the result 350 by a time M. In this embodiment the values for N may also be chosen randomly, and the value of M could then be selected such that M+nN is constant as before. This will hide the randomness of the values. Further, the values of scalars a, b, and c may be fixed or randomly selected. At least two of the scalar values a, b, and c need to different so that the input data is processed at different times in at least two of the crypto cores. The secure circuit 300 may be extended to an even larger number of instances by adding additional crypto cores and associated delays. Further, the secure circuit 300 may be simplified by setting a to 0 and b to n. As a result, the delay 310 and the delay 324 may be deleted from the circuit as each of these delays would be zero.

The embodiments described in FIGS. 1-3 may also be implemented completely in hardware or a combination of both hardware and software. Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A circuit, comprising:
a first secure circuit configured to receive an input and to produce a first output;
a first delay circuit configured to receive the first output and to produce a first delayed output delayed by a time N;
a second delay circuit configured to receive the input and to produce a delayed input delayed by a time N;
a second secure circuit configured to receive the delayed input and to produce a second delayed output; and
a comparator configured to compare the first delayed output to the second delayed output and to produce a result, wherein the result is one of the first delayed output or second delayed output when the first delayed output matches the second delayed output and the result is an error value when the first delayed output does not match the second delayed output.

2. The circuit of claim 1, wherein the value of N is randomly selected.

3. The circuit of claim 1, wherein the value of N is periodically changed.

4. The circuit of claim 1, further comprising:
a third delay circuit configured to receive the result and to produce a delayed result delayed by a time M.

5. The circuit of claim 4, wherein the value of N is randomly selected and the value of M=x−N where x is a constant total delay value.

6. The circuit of claim 5, wherein the value of N and M are periodically changed.

7. A method of securely producing an output by a circuit, comprising:
receiving an input by a first secure circuit and producing a first output;
receiving the output by a first delay circuit and producing a first delayed output delayed by a time N;
receiving the input by a second delay circuit and producing a delayed input delayed by a time N;
receiving the delayed input by a second secure circuit and producing a second delayed output; and
comparing by a comparator the first delayed output to the second delayed output and producing a result, wherein the result is one of the first delayed output or second delayed output when the first delayed output matches the second delayed output and the result is an error value when the first delayed output does not match the second delayed output.

8. The method of claim 7, wherein the value of N is randomly selected.

9. The method of claim 7, wherein the value of N is periodically changed.

10. The method of claim 7, further comprising:
receiving the result by a third delay circuit and producing a delayed result delayed by a time M.

11. The method of claim 10, wherein the value of N is randomly selected and the value of M=x−N where x is a constant total delay value.

12. The method of claim 11, wherein the value of N and M are periodically changed.

13. A circuit, comprising:
a first delay circuit configured to receive an input and to produce a first delayed input delayed by a time a·N, where N is a time delay and a is a scalar value from 0 to n;
a second delay circuit configured to receive the input and to produce a second delayed input delayed by a time b·N, where b is a scalar value from 0 to n;
a third delay circuit configured to receive the input and to produce a third delayed input delayed by a time c·N, where c is a scalar value from 0 to n;
a first secure circuit configured to receive the first delayed input and to produce a first delayed output;
a second secure circuit configured to receive the second delayed input and to produce a second delayed output;

a third secure circuit configured to receive the third delayed input and to produce a third delayed output;

a fourth delay circuit configured to receive the first delayed output and to produce a fourth delayed output delayed by a time $(n-a) \cdot N$;

a fifth delay circuit configured to receive the second delayed output and to produce a fifth delayed output delayed by a time $(n-b) \cdot N$;

a sixth delay circuit configured to receive the third delayed output and to produce a sixth delayed output delayed by a time $(n-c) \cdot N$; and a comparator configured to compare the fourth delayed output, the fifth delayed output, and sixth delayed output and to produce a result, wherein the result is one of the fourth delayed output, fifth delayed output, or second delayed output when the fourth delayed output, the fifth delayed output, and sixth delayed output are all equal to one another and the result is an error value otherwise.

14. The circuit of claim 13, wherein the value of N is randomly selected.

15. The circuit of claim 13, wherein the value of N is periodically changed.

16. The circuit of claim 13, further comprising:
a third delay circuit configured to receive the result and to produce a delayed result delayed by a time M.

17. The circuit of claim 16, wherein the value of N is randomly selected and the value of $M=x-N$ where x is a constant total delay value.

18. The circuit of claim 17, wherein the value of N and M are periodically changed.

19. The circuit of claim 17, wherein at least two of the scalar values a, b, and c are different.

* * * * *